(12) United States Patent
Olsen (10) Patent No.: US 8,434,769 B2
(45) Date of Patent: May 7, 2013

(54) TRAILER HITCHING AND TRACKING STEERING

(76) Inventor: Gary E Olsen, Hemet, CA (US)

(*) Notice: Subject to any disclaimer, the term of this patent is extended or adjusted under 35 U.S.C. 154(b) by 0 days.

(21) Appl. No.: 13/304,102

(22) Filed: Nov. 23, 2011

(65) Prior Publication Data

US 2012/0068426 A1 Mar. 22, 2012

Related U.S. Application Data (63) Continuation-in-part of application No. 12/899,321, filed on Oct. 6, 2010, now Pat. No. 8,066, 299.

(60) Provisional application No. 61/249,743, filed on Oct. 8, 2009.

(51) Int. Cl.
*B60B 33/00* (2006.01)

(52) U.S. Cl.
USPC .............. 280/86; 280/5.2; 280/448; 16/34; 16/32; 16/18 B; 16/18 R (58) Field of Classification Search .............. 280/86, 280/5.2, 448, 656; 16/34, 18 B, 18 R, 32
See application file for complete search history.

(56) References Cited

U.S. PATENT DOCUMENTS

| | | | | |
|---|---|---|---|---|
| 2,644,697 | A | * | 7/1953 | Peterson ............ 280/80.1 |
| 2,674,463 | A | * | 4/1954 | Peterson ............ 280/80.1 |
| 2,674,464 | A | * | 4/1954 | Peterson ............ 280/80.1 |
| 3,211,467 | A | | 10/1965 | Siddall |
| 3,520,549 | A | | 7/1970 | De Lay |
| 3,853,330 | A | * | 12/1974 | Hanaoka ............ 280/99 |
| 4,471,508 | A | * | 9/1984 | Seaborg ............ 16/18 R |
| 4,664,403 | A | | 5/1987 | Livingston |
| 5,014,391 | A | * | 5/1991 | Schulte ............ 16/35 R |
| 5,322,328 | A | * | 6/1994 | Van Mill et al. ............ 280/789 |
| 5,472,222 | A | | 12/1995 | Marcy |
| 6,036,217 | A | * | 3/2000 | Burkhart et al. ............ 280/476.1 |
| 6,299,191 | B1 | | 10/2001 | Sargent |
| 6,536,793 | B2 | | 3/2003 | Sargent |
| 6,900,724 | B2 | | 5/2005 | Johnson |
| 6,916,028 | B2 | * | 7/2005 | Shapiro ............ 280/47.34 |
| 7,243,431 | B2 | | 7/2007 | Godwin |
| 7,353,566 | B2 | * | 4/2008 | Scheiber et al. ............ 16/19 |
| 7,354,057 | B2 | | 4/2008 | Milner et al. |
| 7,425,015 | B1 | | 9/2008 | Schipman |
| 7,832,745 | B2 | * | 11/2010 | Rauch, Jr. ............ 280/86 |

* cited by examiner

*Primary Examiner* — Kevin Hurley
*Assistant Examiner* — Michael Stabley
(74) *Attorney, Agent, or Firm* — Kirk A. Buhler; Buhler & Associates (57) ABSTRACT

Improvements in a trailer hitching and tracking steering system are disclosed include a new style RV or wagon style RV that includes an extendable, variable position tow bar that accommodates misalignment of a tow vehicle. The tow bar can be rotated for storage within the RV wagon. Further improvements include a wheel steering mechanism to improve tracking of a towed vehicle using a bi-directional caster front suspension for steering a wagon style RV in both a forward and reverse direction. The caster of the front wheels is automatically re-directed depending upon the direction of travel of the RV. The suspension system includes a steerable rear suspension that minimizes the amount the back wheels will cut the corner when turning. The improvements also include the use of visible light beams to guide a tow vehicle backing up to an RV to be correctly positioned for hitching without assistance.

14 Claims, 9 Drawing Sheets

TRAILER HITCHING AND TRACKING STEERING

CROSS REFERENCE TO RELATED APPLICATIONS

This application is a continuation-in-part of applicant's application Ser. No. 12/899,321 filed on Oct. 6, 2010 now U.S. Pat. No. 8,066,299 which issued on Nov. 29, 2011, which claims priority to application Ser. No. 61/249,743 filed Oct. 8, 2009 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in trailer hitching and trailer tracking systems. More particularly, the present trailering improvements include an adjustable hitching system, a guiding system for determining a hitching position and a tracking system for moving a trailer.

2. Description of Related Art Including Information Disclosed Under 37 CFR 1.97 and 1.98

Trailering a vehicle requires a number of different operations that are often difficult to perform by a single person. Because the hitching position is often located in a place that is difficult to view it is often best performed with two people. In many cases this is not possible. When the trailer vehicle is heavy locating the hitch often requires multiple attempts to line the tow vehicle up with the trailer. There have been several patents that have issued that allow for vertical adjustment of the hitch to secure the trailer with the tow vehicle.

U.S. Pat. No. 6,229,191 issued Oct. 9, 2001 and U.S. Pat. No. 6,536,793 issued Mar. 25, 2003, both to Frank T. Sargent disclose a Double-Acting Trailer Hitch. Both of these patents allow for vertical adjustment and limited angular adjustment of the tow ball. While these patents provide for some adjustment, the location of the tow vehicle to the trailer must still be placed within inches of the desired location.

U.S. Pat. No. 4,664,403 issued May 12, 1987 to C. Glen Livingston discloses a Hitch Adapter for Double Caster Wheel Trailer. This patent provides for limited side-to-side adjustment of the tow ball. The side-to-side adjustment provides improved tracking of the towed vehicle. While this patent provides some adjustment to the hitch ball position the locating is limited to the amount of tracking that is possible with the caster wheels of the tow vehicle.

U.S. Pat. No. 6,900,724 issued May 31, 2005 to Keith R. Johnson, U.S. Pat. No. 7,243,431 issued Jul. 17, 2007 to W. Lee Godwin and U.S. Pat. No. 7,354,057 issued Apr. 8, 2008 to Gary Milner each disclose the use of a laser type sighting device, but none of these patents disclose using a pair of laser devices that provide distance and cross when the tow vehicle is in a preferred position.

U.S. Pat. No. 3,211,467 issued Oct. 12, 1965 to S. G. Siddal and U.S. Pat. No. 3,520,549 issued Jul. 14, 1970 to M. S. De Lay both disclose a steering mechanism for steering trailing wheels. While both of these patents disclose steering mechanisms for steering trailering wheels, neither of them disclose the steering mechanism as disclosed in this application.

What is needed is a complete overhaul of trailer hitching, tracking and steering to significantly reduce the time and effort to connect and trailer and steer a trailer once it is connected to a tow vehicle. The proposed improvements provide these solutions with the introduction of a new class of Recreational Vehicle (RV) the "Wagon Style RV" with axle's front and back like most cars and trucks and most particularity like wagons, not in the center like all trailers. In addition to the above improvements the RV wagon will reduce or eliminate tow vehicle passenger bounce at road bumps and dips, RV sway problems, eight miscellaneous loose hitching parts to assemble and disassemble, weighing 40 to 50 pounds, each time the RV is hitched or unhitched to the tow vehicle, number of times the trailer front jack stand has to be cranked up and down to effect the hitching process, 400 to 900 pounds of weight on the back of the tow vehicle, exposed propane tanks and batteries in addition to the front jack stand on most trailers, skids or skid wheels at the back of the trailer and reducing the time it takes to hitch or unhitch from 15 or 20 minutes to under 2 minutes with no loose parts to assemble. The proposed improvements provide these solutions.

BRIEF SUMMARY OF THE INVENTION

It is an objective of the improvements in trailer hitching and tracking steering to provide a hitch that is expandable to accommodate hitching where the tow vehicle is misaligned with the new Wagon Style RV. The misalignment is accommodated by telescoping arms on the tow bar hitch. The telescoping sections are movable to connect the hitch to the tow vehicle's hitch receiver. Once the tow bar is connected, the tow vehicle can be moved forward until the tow bar extends and the spring driven tapered pins lock the arms of the tow bar in the extended position for travel. By withdrawing the tapered spring driven pins out of the telescoping arms the tow bar can be removed from the tow vehicle hitch receiver and raised up and into the hitch compartment to be stored out of the way and out of sight when the hitch compartment door is closed. This also will reduce the parked area used by the Wagon Style RV and further reduce the possibility of harm to a person that may accidentally walk into the lowered tow bar.

It is an object of the improvements in trailer hitching and tracking steering to provide a front wheel suspension with bi-directional caster for steering a Wagon Style RV in both a forward and a reverse direction. The wheels caster setting can be re-directed, depending upon the direction of travel of the RV, to allow the wheels to automatically shift caster direction based upon the direction of travel of the tow vehicle.

It is another object of the improvements made possible with the Wagon Style RV to improve the steering and tracking of the towed vehicle. This system will provide caster for the front wheels to follow the tow vehicle in forward or reverse and the system also provides steering of the rear wheels to minimize the amount the rear of the RV will cut the corner when making turns. In addition to eliminating wheel scrubbing that occurs when all the wheels only track in a straight forward or rearward direction.

It is still another object of the improvements in RV hitching and tracking steering to utilize two or more visible laser light beams to easily and effectively guide a tow vehicle driver to position the tow vehicle in the correct position to hitch the RV without any help. Keep in mind that the tow bar mechanism allows for a miss-alignment of more than 8 inches in either direction making the positioning of the tow vehicle very easily done without assistance. The laser lights on the front of the RV are adjusted to converge in the center of the rear window of the tow vehicle when the tow vehicle reaches a place near the optimum position to hitch the RV to the tow vehicle. The laser lights produce two small red dots on the back window that will move together as the tow vehicle is backed toward the RV. This makes it easy to stop just the right distance from the RV and the red dots only have to converge in the vicinity of the center of the back window because the tow bar hitch affords ample side to side adjustment if the tow vehicle is not in the exact right place. The driver will see the laser beams in his inside rearview mirror.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
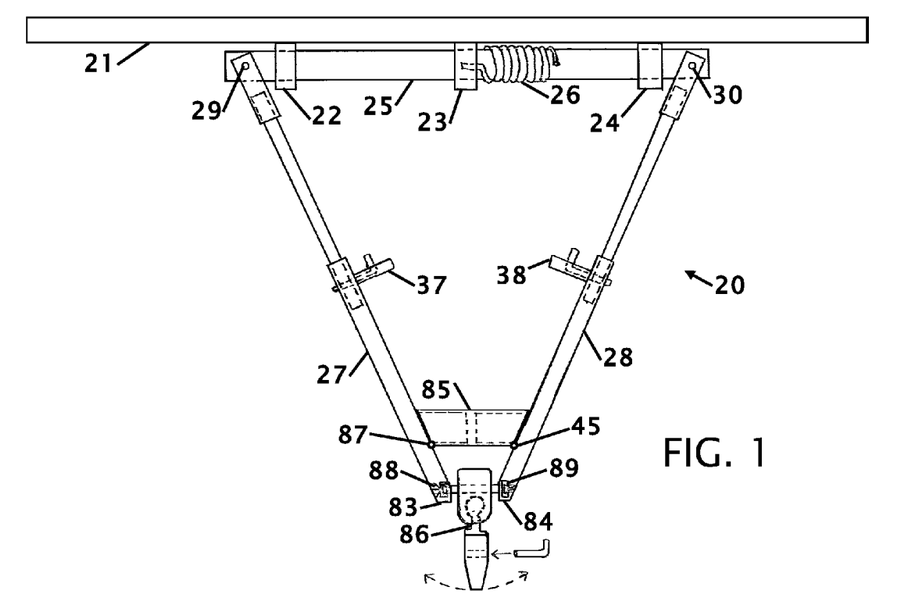
FIG. 1 shows the tow bar hitch in the travel position.
Figure 2:
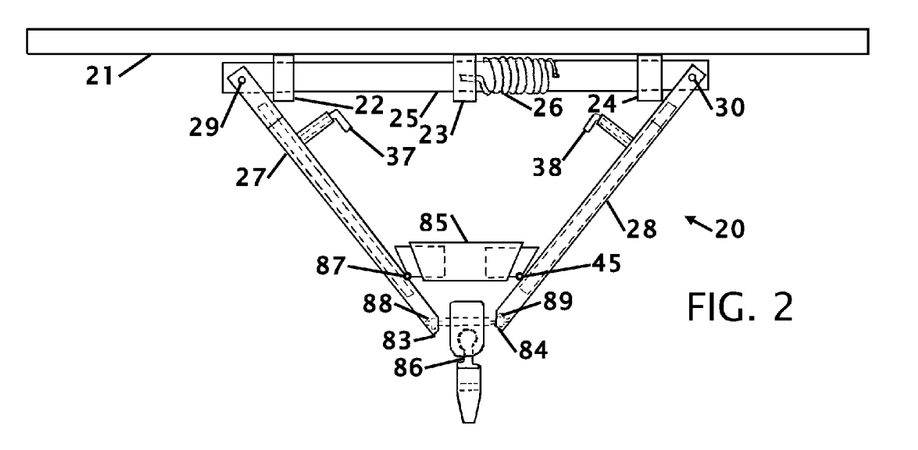
FIG. 2 shows a top view of the tow bar hitch in the retracted position.

FIG. 1 shows a top view of the tow bar hitch in the "in use travel position". FIG. 2 shows a top view of the tow bar hitch 20 in the retracted position. In FIG. 1, both side rails 27 and 28 are locked in place by the spring loaded, tapered locking pins 37 and 38. It is important to note that the telescoping stabilizer bar 85 is shown closed in FIG. 1 and open in FIG. 2. The stabilizer bar 85 stabilizes the tow bar assembly to a rigid configuration that is necessary to tow the RV and more particularly to push the RV backward when parking. In the "in use travel position" the coil spring 26 is resisting the weight of the hitch assembly making it easy to lower down to the travel position and raise back up again to the out of use or put away position as shown in FIG. 2. When not in use the hitch assembly is raised upright with the tubular base 25 rotating inside of the three supports 22, 23 and 24. This position represents the put away or stored position. While the RV is parked and the tow bar is in the put away position the locking pins 37 and 38 are withdrawn and the two side rails 27 and 28 are in the telescope closed position making the entire assembly much shorter and more compact.

The stabilizer bar 85 telescopes to allow for side to side motion of the actual hitch stem in order to align the stem with the hitch receiver on the back of the tow vehicle. The stabilizer bar is connected to the two side rails at points 45 and 87 which is a pivotal connection that allows for side to side movement. The ends 83 and 84 of the two side rails 27 and 28 pivot vertically at points 88 and 89 to allow for rotational positioning.

To use the tow bar 20 a person takes hold of the tow bar at the ball and socket assembly 86 and begin to swing out and down to the level of the hitch receiver at the back of the tow vehicle that you have positioned in front of the RV to hitch up. The person then pulls the assembly toward the tow vehicle to a position of about half of the full extension of the two side rails 27 and 28. At this point the stem of the ball and socket assembly can be moved from side to side because the two side rails 27 and 28 are not locked in place in this position. This allows for aligning the stem with the hitch receiver on the back of the tow vehicle if the vehicle was not parked in exactly the right place. Once the stem is aligned with the hitch receiver the stem can be inserted into the receiver and safety pin and cotter key installed. At this point the two side rails 27 and 28 are not yet completely extended and the locking pins 37 and 38 are still withdrawn. Now move the two spring loaded locking pins to the ready position so they will spring to the lock position when the side rails reach the fully extended position at which point the locking pin spring will drive the locking pins in the hole. This will take place when the driver starts to move the tow vehicle forward and pull the two side rails out to the extended position and make the Tow Bar secure for travel.

To unhitch a person begins by removing the cotter key and safety pin at the trailer hitch receiver at the rear of the tow vehicle. The person withdraws the two locking pins 37 and 38 and while holding the ball and socket assembly 86 they pull the stem out of the trailer hitch receiver. This will cause the two side rails 27 and 28 to begin to telescope closed and when the stem is clear of the hitch receiver begin to raise the tow bar up and toward the front of the RV at which time the two side bars will slide all the way to the telescope closed position and when you have the tow bar all the way up it is in the out of use put away position.

Figure 3:
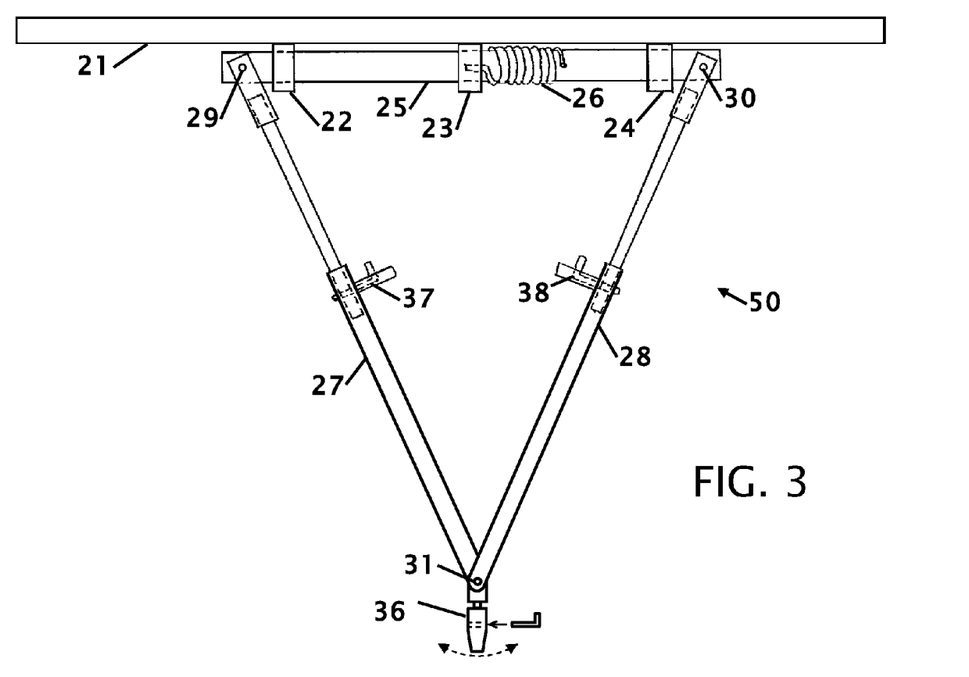
FIG. 3 shows a second preferred embodiment of the tow bar hitch in the travel position.
Figure 4:
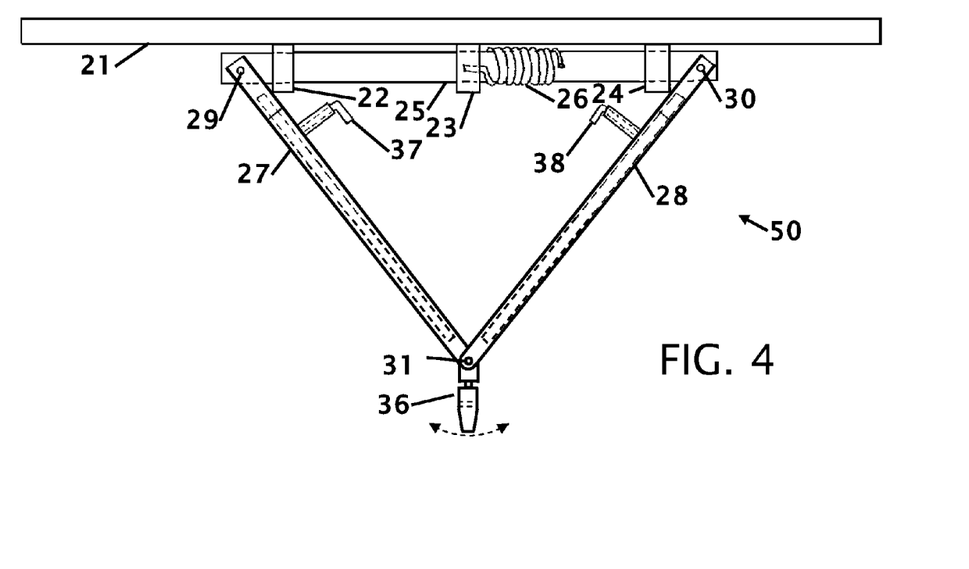
FIG. 4 shows a top view of the second preferred embodiment of the tow bar hitch in the retracted position.

FIG. 3 shows a top view of the tow bar hitch in the "in use travel position". FIG. 4 shows a top view of the tow bar hitch 50 in the retracted position. In FIG. 3, both side rails 27 and 28 are locked in place by the spring loaded, tapered locking pins 37 and 38. In the "in use travel position" the coil spring 26 is resisting the weight of the hitch assembly making it easy to lower down to the travel position and raise back up again to the out of use or put away position as shown in FIG. 4. When not in use the hitch assembly is raised upright with the tubular base 25 rotating inside of the three supports 22, 23 and 24. This position represents the put away or stored position. While the RV is parked and the tow bar is in the put away position the locking pins 37 and 38 are withdrawn and the two side rails 27 and 28 are in the telescope closed position making the entire assembly much shorter and more compact.

To use the tow bar 50 a person takes hold of the universal joint 31 hitch 36 and begin to swing out and down to the level of the hitch receiver at the back of the tow vehicle that you have positioned in front of the RV to hitch up. The person then pulls the assembly toward the tow vehicle to a position of about half of the full extension of the two side rails 27 and 28. At this point the stem of the ball and socket assembly can be moved from side to side because the two side rails 27 and 28 are not locked in place in this position. This allows for aligning the stem with the hitch receiver on the back of the tow vehicle if the vehicle was not parked in exactly the right place. Once the stem is aligned with the hitch receiver the stem can be inserted into the receiver and safety pin and cotter key installed. At this point the two side rails 27 and 28 are not yet completely extended and the locking pins 37 and 38 are still withdrawn. Now move the two spring loaded locking pins to the ready position so they will spring to the lock position when the side rails reach the fully extended position at which point the locking pin spring will drive the locking pins in the hole. This will take place when the driver starts to move the tow vehicle forward and pull the two side rails out to the extended position and make the Tow Bar secure for travel.

To unhitch a person begins by removing the cotter key and safety pin at the trailer hitch receiver at the rear of the tow vehicle. The person withdraws the two locking pins 37 and 38 and while holding the universal joint 31 hitch 36 they pull the stem 36 out of the trailer hitch receiver. This will cause the two side rails 27 and 28 to begin to telescope closed and when the stem is clear of the hitch receiver begin to raise the tow bar up and toward the front of the RV at which time the two side bars will slide all the way to the telescope closed position and when you have the tow bar all the way up it is in the out of use put away position.

Figure 5:
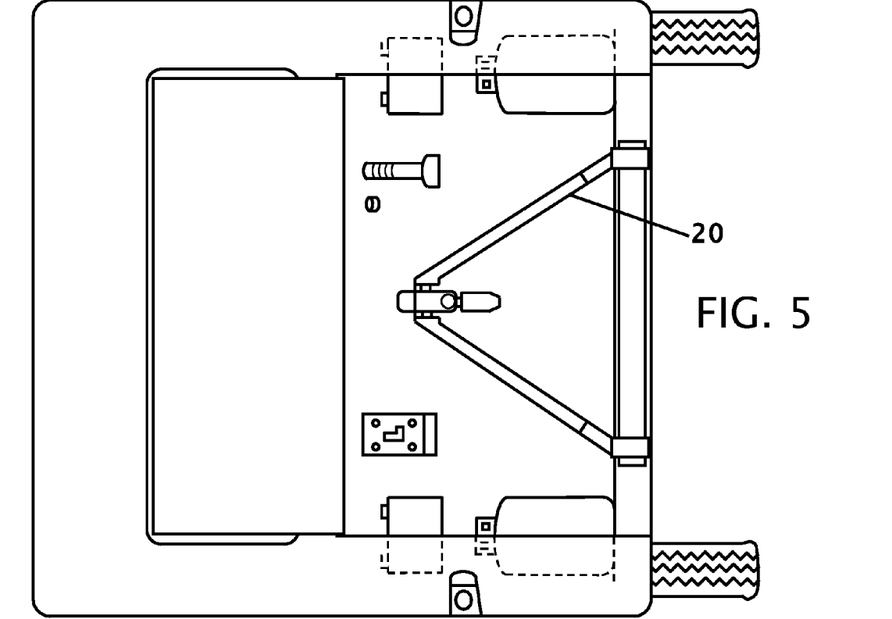
FIG. 5 shows a front view of the tow bar hitch in the out of use or put away position.
Figure 6:
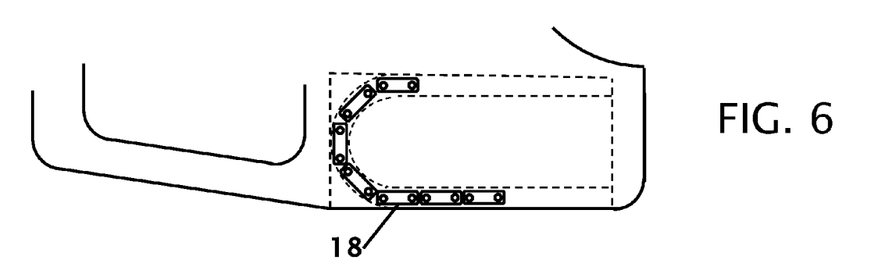
FIG. 6 shows a side view of the tow bar storage compartment with another contemplated version of sectional doors.
Figure 7:
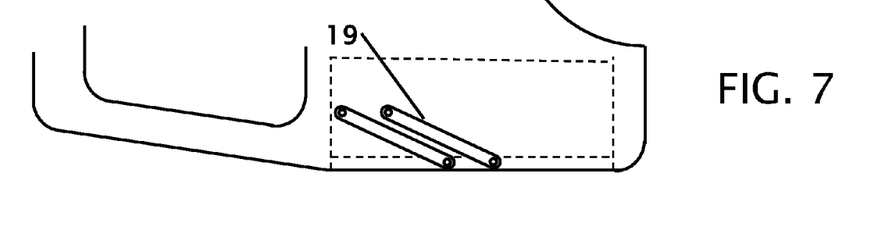
FIG. 7 shows a side view of the tow bar storage compartment with another contemplated version of a one piece door rotating out and up.

FIG. 5 shows a front view of the tow bar hitch 20 or 50 in the out of use or put away position. FIG. 6 shows a side view of the tow bar storage compartment with another contemplated version of a sectional door 18. FIG. 7 shows a side view of the tow bar storage compartment with another contemplated version of a one piece door 19.

Figures 8, 9:
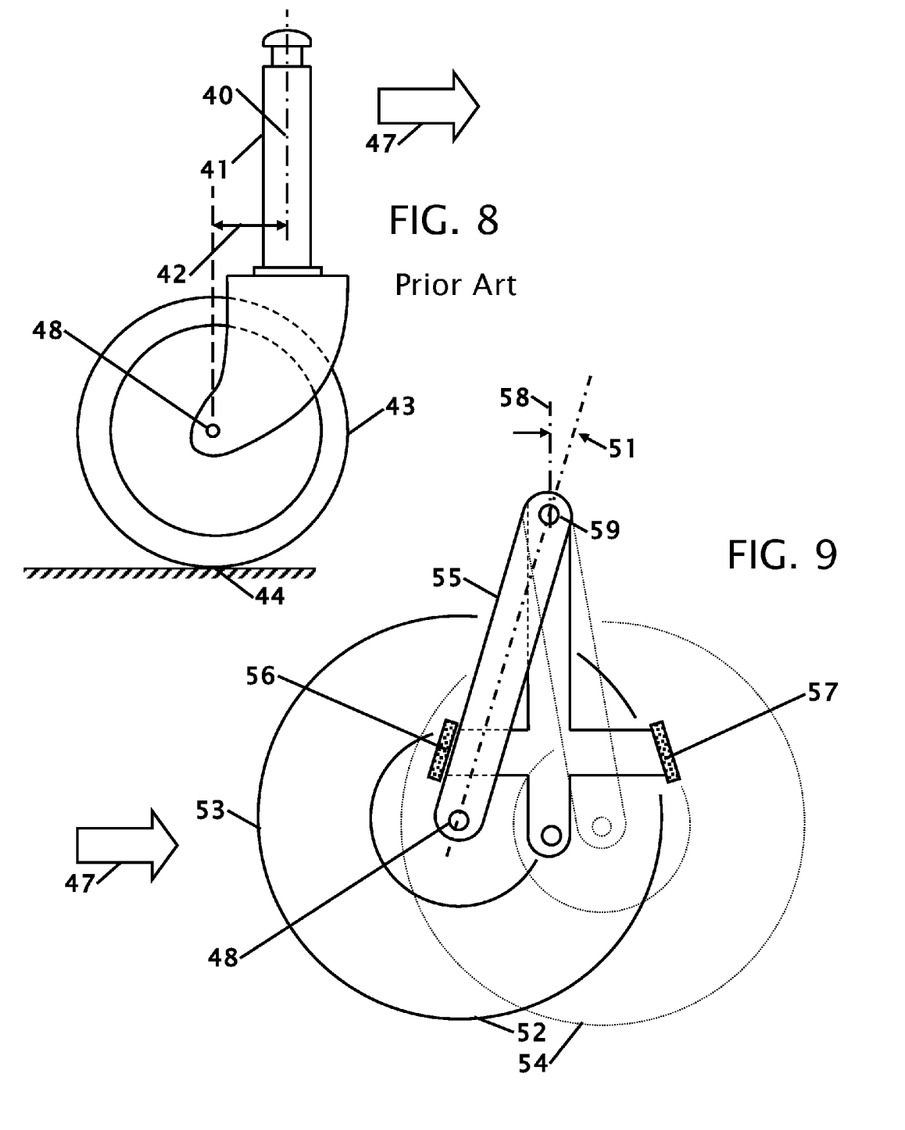
FIG. 8 shows a prior art pivoting caster.
FIG. 9 shows a Bi-Directional Caster.

FIG. 8 shows a prior art pivoting caster. Prior art pivoting casters are those found on the front of baby buggies, shopping carts, swivel chairs and many more moveable objects. These casters are able to go in any direction by swiveling around a full 360 degrees around the central axis 40. These Casters have a straight up and down vertical axis 41 rather than a tilted one like the automotive wheel suspension. The vertical axis 40 is not tilted but strait up and down and the wheel is free to move from forward 47 caster to rearward caster based upon the direction of travel, pull or drag on the bottom 44 of the wheel 43. The wheel 43 and axle 41 is offset 42 from the vertical axes 41 so the wheel 43 has the inclination to follow whatever direction it is pulled or pushed.

FIG. 9 shows a Bi-Directional Caster. The bi-directional caster allows the wheels to self-steer the trailing wheels 53 while moving forward 47 and or backward using a variation of the utility caster system rather than the usual automotive caster system. In an automotive caster system the caster on the front wheels of most automotive vehicles, motorcycles and bicycles is primarily to keep the vehicle going straight if the driver lets go of the steering wheel or handle bars. This arrangement makes the vehicle come back to straight after making a turn. This caster has a secondary characteristic in that it makes the wheels want to follow the tow vehicle when being towed. This allows people with motor homes to tow a car behind their motor home.

The self-tracking is performed because of the caster design of the car front suspension system allows for forward tracking but does not provide for tracking in a reverse direction or back up. The existing automotive caster system is achieved by swinging 51 the vertical axis of the front wheels 53 back at the top and forward at the bottom. The purposed bi-directional caster provides a means to easily and effectively change the caster of the front wheels of a towed vehicle so they will caster in both directions. This allows the wheel 53 to caster going forward 52 and backward 54 when being towed by a tow vehicle. This system will make it possible to move the two axles on a travel trailer chassis from the center of the trailer to one axle in front and the other in back much the same as most all four wheeled vehicles. This would be better described as a travel wagon because with one axle in front and one axle in back it resembles a child's toy wagon or a farmers' hay wagon.

The proposed solution retained the utility casters ability to caster in both directions but not swivel around to accomplish this. The spindle 48 and spindle arm 55 can swing in a limited arc fashion between the two stops 56 and 57. The arm 55 is lifted over the central axis 58 of the pivot 59 to lock the arm 55 at the end (56 or 57) of the swing to the new position because the weight of the travel wagon works to keep it there until shifted to the other direction when the vehicle is to change direction.

Figure 10:
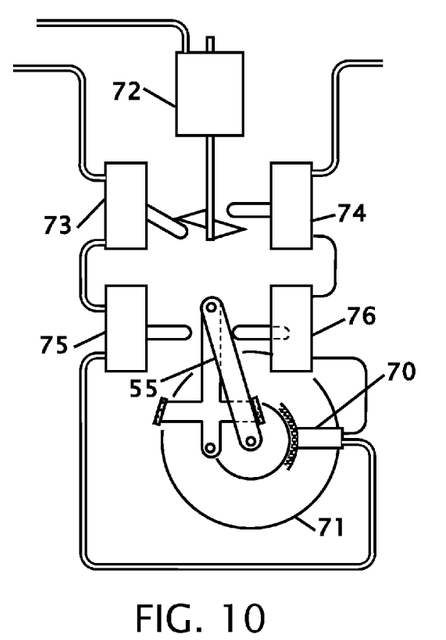
FIG. 10 shows an electrical pictorial diagram of a directional switching system.

FIG. 10 shows an electrical pictorial diagram of a directional switching system used with the pivoting arm 55. The method of shifting the front wheels of the towed vehicle between forward caster and backward caster. When the tow vehicle is shifted to reverse an electrical circuit on the vehicle sends electricity to the back-up lights at both taillights on the back of the vehicle. By tapping into this electric circuit and directing the flow of electricity to the towed vehicle (travel wagon) through the existing power cable connection to the vehicle being towed we have a means to send a measured amount of electrical current to temporarily apply the electric front wheel brakes 70 on the vehicle being towed. By applying the two front brakes 70 on the towed vehicle we have caused them to hold the front wheels still as the tow vehicle begins to move backward and push the towed vehicle back. This will cause the front wheels 71 now attached to the second spindle arm 55 to swing to the rearward caster position and therefore caster properly while being backed up. When the driver shifts back to drive (forward) the electric current will temporarily apply the towed vehicle front brakes again and hold the wheels from rolling while the tow vehicle and towed vehicle move forward until the caster shifting is complete and the electric brakes are released.

The tow vehicle is free to pull the travel wagon just like the motor home pulls a car but unlike the motor home and the car, the travel wagon can be backed up by simply shifting the tow vehicle to reverse which automatically adjusts the RV front wheels to reverse caster. When electric solenoid 72 is activated the arm of the solenoid will open the reverse switch 73 and when the solenoid 72 is de-activate the arm of the solenoid will allow reverse switch 73 to close and open forward switch 74 which intern adjusts the RV front wheels back to forward caster for driving forward. The motion of the spindle arm 55 will change the position of reverse switch 75 and forward switch 76 to complete the shifting of the front wheels caster.

Figure 11:
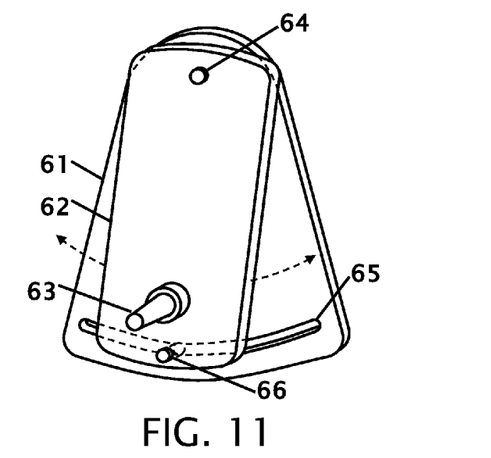
FIG. 11 is a second preferred embodiment of a bi-directional caster.

FIG. 11 is a second preferred embodiment of a bi-directional caster. In this embodiment the spindle arm 61 is attached to the end of the axle 63 where the front wheel spindle is normally attached to a stock trailer or wagon. A second spindle arm 62 pivots at bearing 64 in a limited arc of movement for a wheel spindle 63. The location of the second spindle arm 62 is changeable based upon the direction of travel of the trailer or wagon to move the second spindle arm 62 in a forward or reverse caster position. A slot 65 in the first spindle arm provides a limited amount of arc travel to the second spindle arm 62 with the use of a bolt 66, or similar device that is installed through the slot 65 from the back side of the first spindle arm 61 and threaded into the second spindle arm 62.

Figure 12:
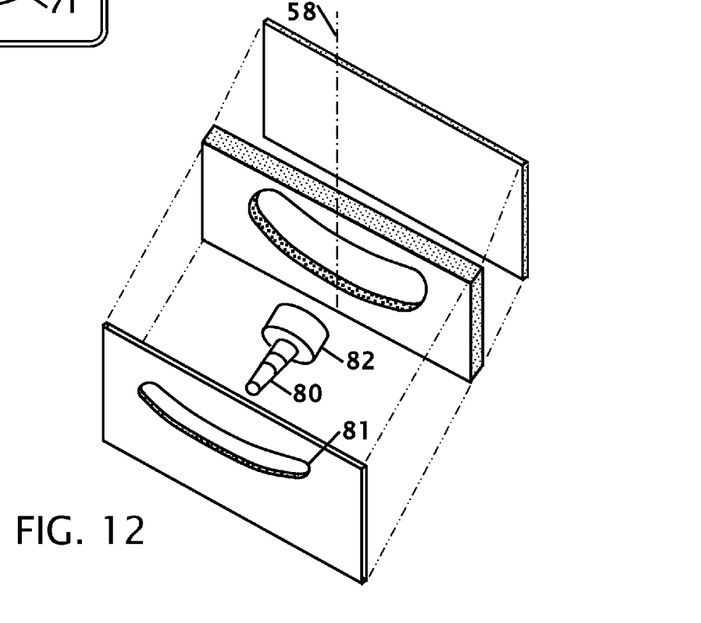
FIG. 12 is a third preferred embodiment of a bi-directional caster

A third preferred and contemplated method of providing bi-directional caster is shown in FIG. 12. This method will roll or slide the spindle 80 and vehicle wheel forward and in back of the vertical axes 58 of the suspension system rather than the swinging motion described. This system also provides a "lock in place" characteristic made possible by the arc design 81 in the center section where the spindle wheel 82 will travel from forward to rearward caster position. As seen in FIG. 9, the spindle positioned at the lower end of the second spindle arm this spindle roller will be locked in place at the end of its travel by the weight of the RV. This configuration is as shifted from forward and backward caster in the same way by using the front wheelbrakes the same as previously shown and described. This rolling or sliding spindle assembly would be installed on the vehicle front suspension by removing the existing spindle and replacing it with this sliding assembly to accomplish the forward and rearward caster desired.

Figure 13:
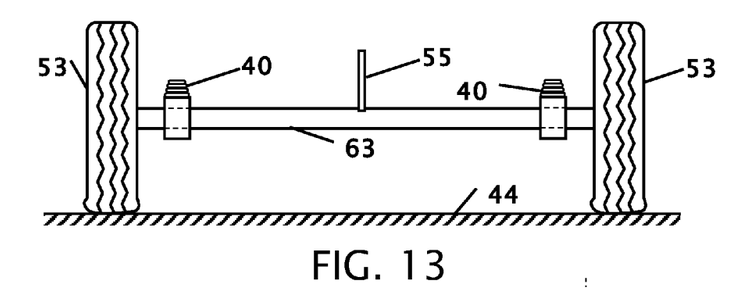
FIG. 13 is a rear view of the pivoting axis according to a fourth embodiment.
Figure 14:
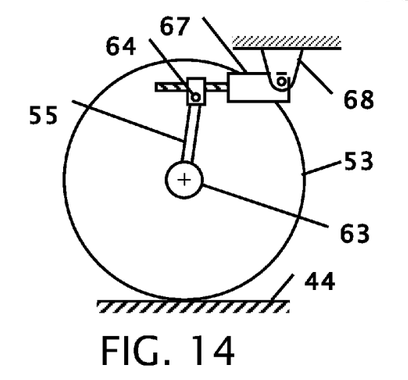
FIG. 14 is a side view of the pivoting axis according to the fourth embodiment.
Figure 15:
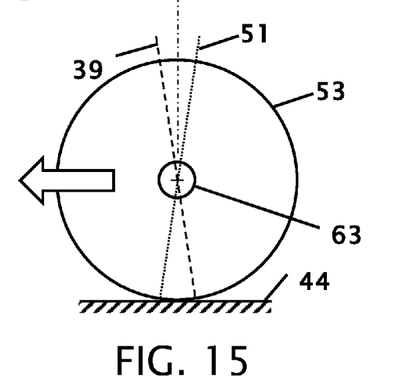
FIG. 15 is a side view of the fourth embodiment showing the different camber directions for forward and reverse.

FIG. 13 is a rearview of the pivoting axis according to a fourth embodiment, FIG. 14 is a side view of the pivoting axis according to the fourth embodiment and FIG. 15 is a side view of the fourth embodiment showing the different camber directions for forward and reverse. In FIG. 13, the two outside tires 53 are shown mounted on the outsides of the central shaft 63 and resting on the ground 44. The axle 63 supports the weight of the trailer on leaf springs 40. A pivot arm 55 changes the tilt or caster of the wheel 53 from forward caster 51 to backward caster 39 based upon the direction of travel of the trailer as shown in FIG. 15. A switching mechanism, similar to the mechanism shown in FIG. 10, can use a drive motor 67 to turn a screw 64 that changes the caster angle of the pivot arm 55 as shown in FIG. 14. The drive motor 67 can be mounting to the underside 68 of the trailer.

When the tow vehicle is shifted into reverse an electric circuit on the tow vehicle sends electricity to the back-up lights of the tow vehicle. The electrical circuit of the reverse lights can be detected and a relay or other device can use this detection to set the caster direction of the tires using the electrical connection between the tow vehicle and the trailer. Using this system the electrical motor 67 can be activated to shift the pivot arm 55 to the reverse caster position to allow for backward travel. When the back-up lights are not energized the drive motor 67 will change to caster direction for forward 51 travel of the vehicle.

Figure 16:
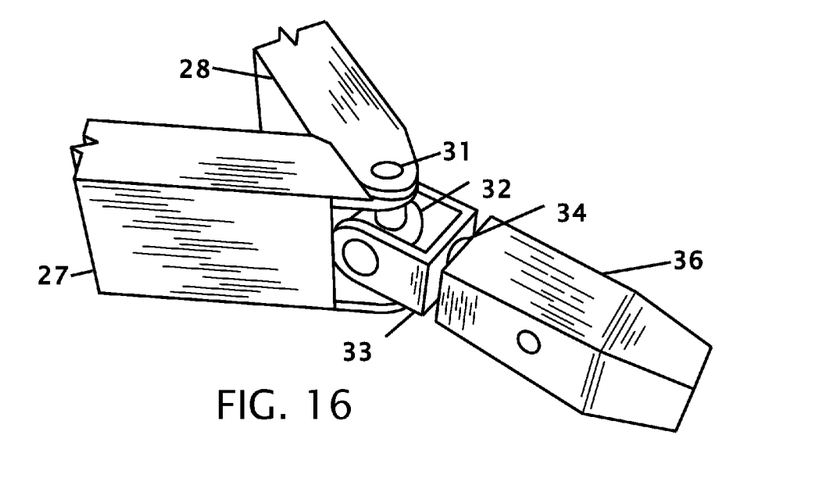
FIG. 16 is an isometric view of the hitch connection from FIGS. 3 and 4.

FIG. 16 is an isometric view of the hitch connection from FIGS. 3 and 4. The universal joint 31 hitch 36 allows rotation 34 of the hitch 36 when the trailer rocks from side to side relative to the tow vehicle. A universal joint 31, 32 and 33 allow for three directions of free rotation to allow for angular yaw pitch and roll of the trailer relative to the tow vehicle. This construction eliminates the typical ball and socket connection between a trailer and a tow vehicle but uses the standard receiver that is present on most tow vehicles. The universal joint 31 hitch 36 is shown with the connecting arms 27 and 28 of the trailer tow bar.

Figure 17:
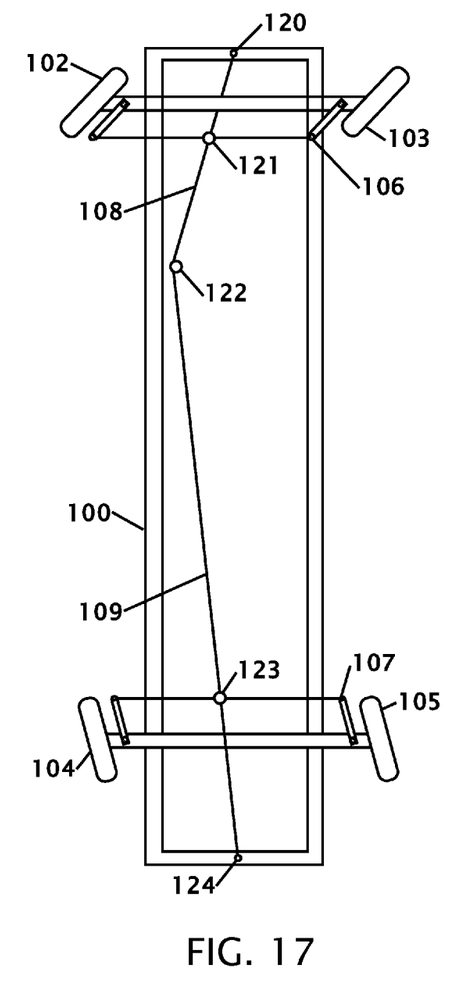
FIG. 17 is a top view of a first preferred embodiment of a steerable rear suspension.
Figure 18:
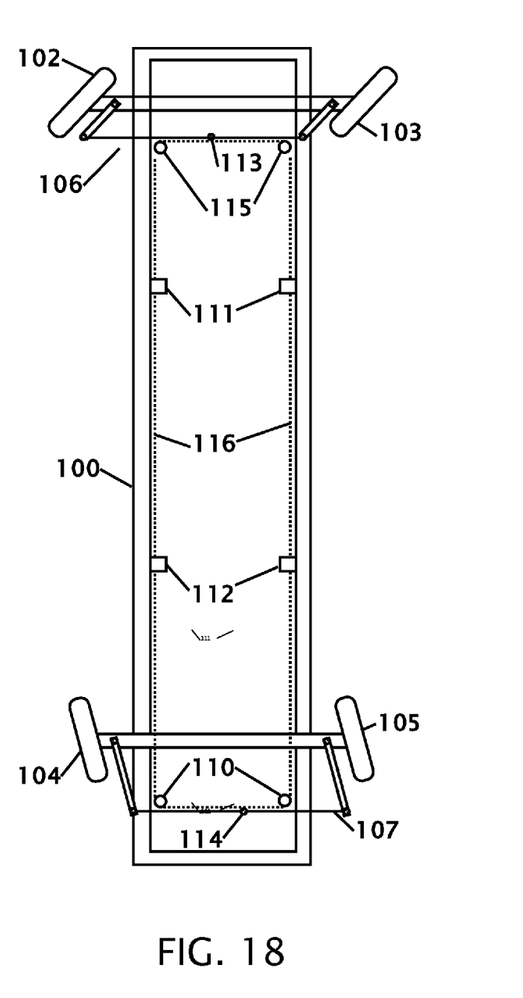
FIG. 18 is a top view of a second preferred embodiment of a steerable rear suspension.

FIG. 17 is a top view of a first preferred embodiment of a steerable rear suspension. FIG. 18 is a top view of a second preferred embodiment of a steerable rear suspension. These top views of the RV chassis or frame 100 show the front wheels 102 and 103 in a right turn position. The rear wheels 104 and 105 are in a slight left turn position to keep the rear of the RV from cutting the corner in a right turn. The tie rods for front and back wheels keep the wheels turning left and right in unison. A first lever arm 108 (moved side to side by the front wheel tie rod 106 when the front wheels turn left or right). A second lever arm 109 (moved side to side by the first lever arm and in turn moves the rear wheel tie rod 107 side to side which ultimately steers the rear wheels 104 and 105 in the opposite direction of the front wheels to keep the rear of the vehicle from cutting the corner when turning. The pivotal anchor point 120 of the first lever arm is attached to the chassis. The sliding connection of the first lever arm 108 to the front wheel tie rod 106 that moves the lever arm side to side when the front wheels 102 and 103 turn left or right. Ultimately, turning the rear wheels by moving the second lever arm side to side. Sliding connection 121 connects the front lever arm 108 to the front wheel tie rod 106. The sliding connection 122 of the first lever arm to the second lever arm 109 that provides the side to side motion necessary to ultimately steer the rear wheels 104 and 105 in the direction desired to limit the rear of the vehicle from cutting the corner when turning. The sliding connection 123 of the second lever arm 109 to the rear tie rod 107 that moves the tie rod side to side ultimately turning the rear wheels 104 and 105 in the desired direction to limit the vehicle from cutting the corner when turning. The pivotal anchor point 124 of the second lever arm attached to the chassis 100.

In the embodiment shown in FIG. 18, the resulting steering is essentially the same, but the method of turning the wheels is different. In this embodiment, a steel cable 116 connects the front wheel tie rod 106 with the rear wheel tie rod 107. Because of the elongated length of the steel cable 116 a plurality of guides 111 and 112 maintain the steel cable 116 in proper position for its travel between the front pulleys 115 and the rear pulleys 110. The front tie rod 106 is connected to the steel cable 116 with a connector 113 and the rear tie rod 107 is connected to the steel cable 116 with a connector 114. These connectors 113 and 114 allow both the front and rear wheels to turn in unison. When the front wheels 102 and 103 are turned to the right the tie rod 106 moves to the left which pulls the steel cable 116 to the left and moves the rear wheel 104 and 105 tie rod 107 to the right ultimately turning the rear wheels 104 and 105 in the desired direction to limit the vehicle from cutting the corner when turning. The amount of rear wheel steering is expected to be about one half of the front wheel steering and should be adjusted by the manufacturer to provide optimum performance.

Figures 19, 20:
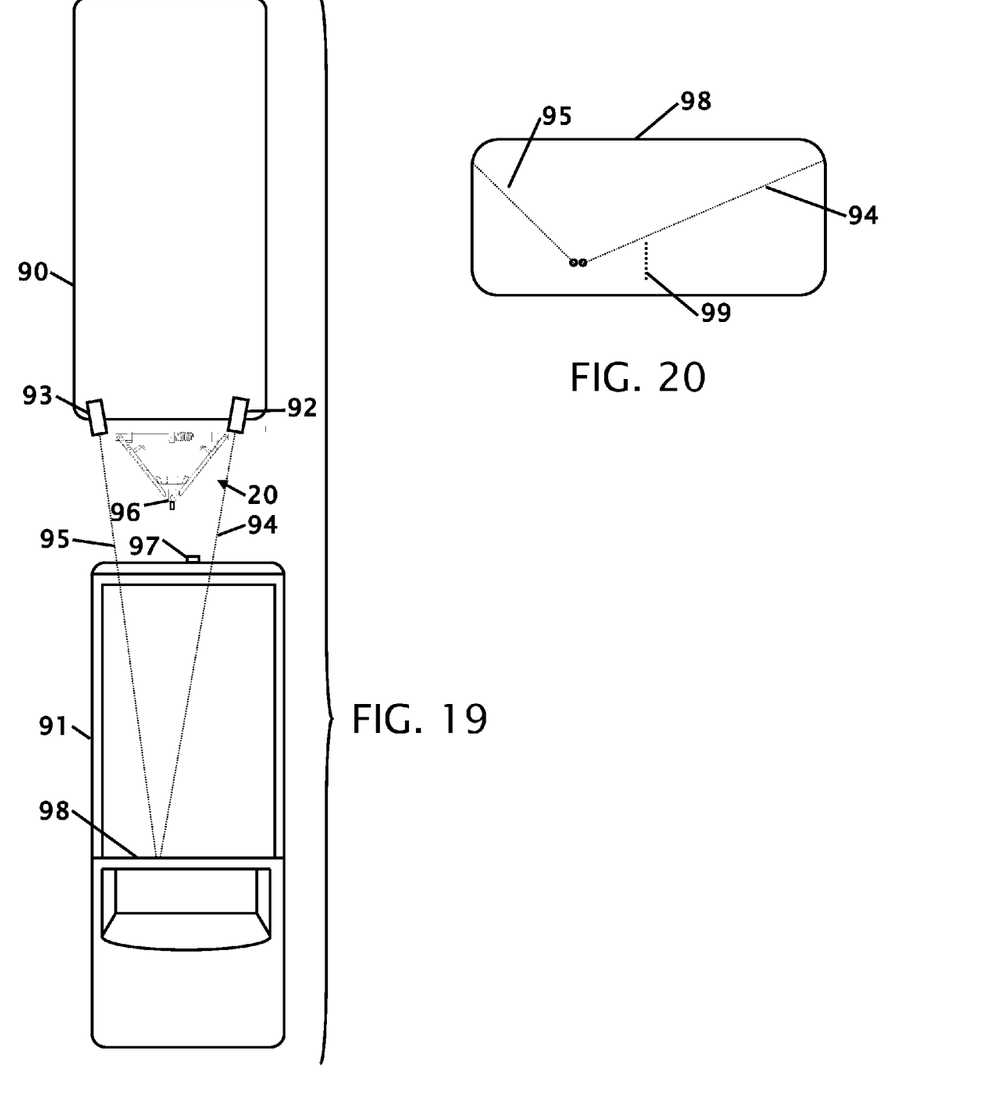
FIG. 19 shows a dual laser sighting mechanism.
FIG. 20 shows an image on a rear window for the dual laser sighting mechanism.

FIG. 19 shows a dual laser sighting mechanism. The RV wagon 90 is shown behind the tow vehicle 91. The tow bar hitch 20 or 50 is shown attached to the RV wagon 90 with the tow bar stem 96 ready to insert into the tow vehicle hitch receiver 97. When connecting an RV wagon 90 to a tow vehicle (unlike the present day RV trailer) the tow vehicle only has to be in the vicinity of the RV wagon to hitch up because of the flexibility of the tow bar hitch system. To assist in aligning the receiver 97 with the tow bar stem 96 an intersecting set of laser light beams 92 and 93 are disclosed. The beams 94 and 95 of light from these lasers can be seen in darkness and in daylight. In the preferred embodiment the lights are adjusted to converge in the center of the rear window 98 of the tow vehicle 91 when the tow vehicle is in the ideal location. When this occurs the driver only needs to be in the vicinity to insert the tow bar stem into the hitch receiver.

FIG. 20 shows an image on a rear window for the dual laser sighting mechanism. As seen in FIG. 18 the driver has backed the tow vehicle toward the RV wagon until the laser beam spots on the rear window converge somewhere in the vicinity of the center of the window. It's easy to back the tow vehicle until the beams converge and then stop but it's harder to hit the exact center of the window from side to side. That's where the flexibility of the tow bar hitch mechanism makes it easy to hit an acceptable position within approximately eight inches on either side of center. These laser lights can be turned on and off from the drivers' seat of the tow vehicle with the use of a key chain remote like the one used to unlock the doors of most automobiles. While this embodiment shows the laser light beams 94 and 95 emitting from the RV 90 to the tow vehicle 91 it is further contemplated that the laser light beams can emit from the tow vehicle 91 where they project and image onto the RV 90 that is visible to the person driving the tow vehicle 91. It is further contemplated that the laser lights 92 and 93 can be electrically connected to the back-up light circuit of the vehicle to only emit light when the tow vehicles is in reverse.

Figure 21:
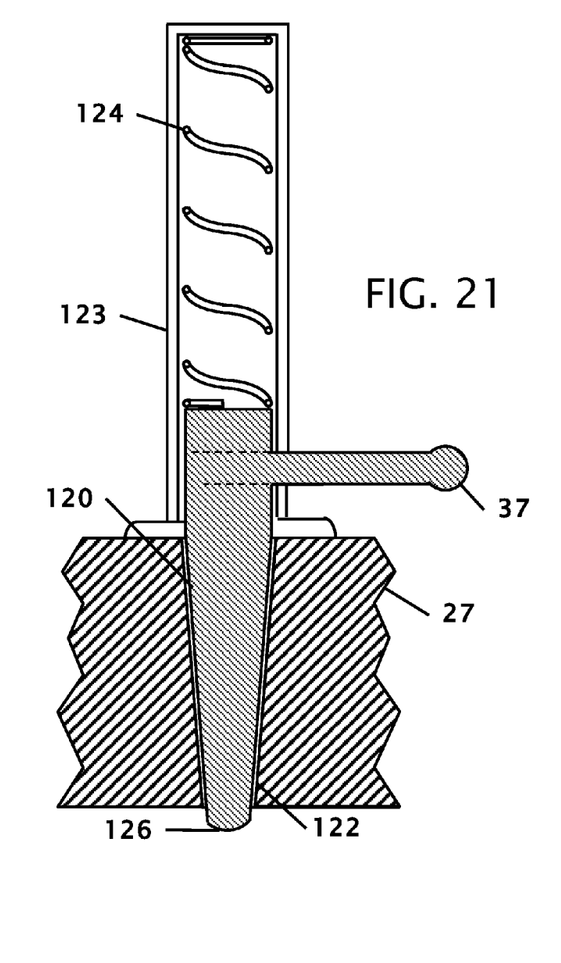
FIG. 21 shows a spring driven tapered locking pin with the tapered pin in an installed orientation.
Figure 22:
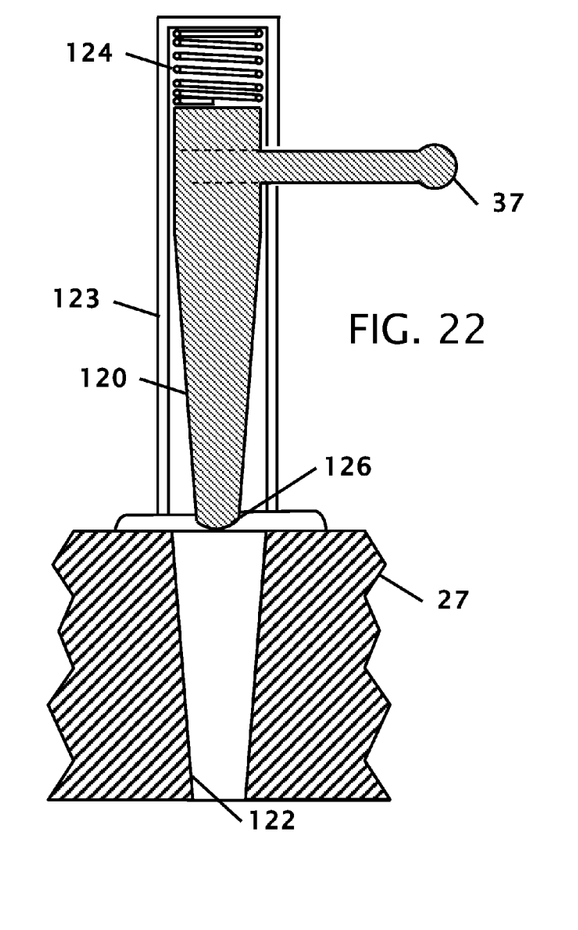
FIG. 22 shows a spring driven tapered locking pin with the tapered pin in a retracted orientation.

FIG. 21 shows a spring driven tapered locking pin with the tapered pin in an installed orientation and FIG. 22 shows a spring driven tapered locking pin with the tapered pin in a retracted orientation. These views only show one side rail 27 and one tapered locking pin 37. While only one side rail and associated tapered locking pin is shown and described, this is typical of the construction of the tapered locking pin that is contemplated to eliminate a requirement for loose parts for assembly and hitching. In FIGS. 1 and 2 only the handle of the locking pin 37 is shown with a housing 123 that contains the sub assembly. Within the housing 123 an extension spring 124 pushes the tapered pin 120 into a tapered receiver 122. The end of the tapered pin 120 is rounded 126 to assist in guiding the tapered pin 120 into the hole 122. To remove the tapered pin 120 the tapered pin 120 is pulled back quickly and should release the tapered pin 120 from the tapered hole 122 because of the tapered configuration. It is also contemplated that the same or similar spring driven tapered pin configuration can be used at the trailer hitch receiver on the back of the tow vehicle instead of the pin and cotter key that is currently being used in most tow vehicles.

Thus, specific embodiments of a trailer hitching and tracking steering system have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A bi-directional caster for a wagon style recreational vehicle comprising:
a recreational vehicle;
an over center spindle and spindle arm that is connected to at least two tires of said recreational vehicle;
a position of said over center spindle arm is changeable based upon the direction of travel of said recreational vehicle, and
depending upon said position of said spindle arm on an over center ramp or arm, said recreational vehicle wheel connected to said spindle arm will self-track in a forward or backward direction of travel of said recreational vehicle; and
said position is adjusted with an actuator that is controlled by a transmission selector from a tow vehicle that changes said caster angle.

2. The bi-directional caster for a wagon style recreational vehicle according to claim 1 wherein said spindle and said spindle arm has physical stop to prevent over travel.

3. The bi-directional caster for a wagon style recreational vehicle according to claim 1 wherein said position is set by applying brakes of said recreational vehicle and pulling or pushing said over center spindle and spindle arm into a desired caster position.

4. The bi-directional caster for a wagon style recreational vehicle according to claim 1 wherein said recreational vehicle has more than one axle.

5. The bi-directional caster for a wagon style recreational vehicle according to claim 4 wherein all of said tires of said vehicle caster based upon said forward or backward direction of travel.

6. The bi-directional caster for a wagon style recreational vehicle according to claim 1 wherein said recreational vehicle has a plurality of axles;
said plurality of axles are steerable, and
said axles being mechanically linked to steer both sets of said plurality of axles.

7. The bi-directional caster for a wagon style recreational vehicle according to claim 1 further has a vehicle hitching alignment guide comprising:
a towable vehicle with a plurality of narrow beam light emitters wherein light beams from said plurality narrow beam light emitters are focused to a known location at a distance in front of said towable vehicle;
a tow vehicle with indicia that is visible on at least one surface for a driver location within said tow vehicle, and
wherein said driver uses light from said plurality of narrow light beam emitters upon said indicia to align and position a first hitching mechanism on said tow vehicle with a second hitching mechanism on said towable vehicle.

8. A bi-directional caster for a wagon style recreational vehicle comprising:
a recreational vehicle;
an over center spindle and spindle arm that is connected to at least two tires of said recreational vehicle;
a position of said over center spindle arm is changeable based upon the direction of travel of said recreational vehicle, and
depending upon said position of said spindle arm on an over center ramp or arm, said recreational vehicle wheel connected to said spindle arm will self-track in a forward or backward direction of travel of said recreational vehicle;, and
said position is adjusted with an actuator that is controlled by back-up lights on a tow vehicle that changes said caster angle.

9. The bi-directional caster for a wagon style recreational vehicle according to claim 8 wherein said spindle and said spindle arm has physical stop to prevent over travel.

10. The bi-directional caster for a wagon style recreational vehicle according to claim 8 wherein said position is set by applying brakes of said recreational vehicle and pulling or pushing said over center spindle and spindle arm into a desired caster position.

11. The bi-directional caster for a wagon style recreational vehicle according to claim 8 wherein said recreational vehicle has more than one axle.

12. The bi-directional caster for a wagon style recreational vehicle according to claim 11 wherein all of said tires of said vehicle caster based upon said forward or backward direction of travel.

13. The bi-directional caster for a wagon style recreational vehicle according to claim 8 wherein said recreational vehicle has a plurality of axles;
   said plurality of axles are steerable, and
   said axles being mechanically linked to steer both sets of said plurality of axles.

14. The bi-directional caster for a wagon style recreational vehicle according to claim 8 further has a vehicle hitching alignment guide comprising:
   a towable vehicle with a plurality of narrow beam light emitters wherein light beams from said plurality narrow beam light emitters are focused to a known location at a distance in front of said towable vehicle;
   a tow vehicle with indicia that is visible on at least one surface for a driver location within said tow vehicle, and
   wherein said driver uses light from said plurality of narrow light beam emitters upon said indicia to align and position a first hitching mechanism on said tow vehicle with a second hitching mechanism on said towable vehicle.

\* \* \* \* \*